3,647,857
Patented Mar. 7, 1972

3,647,857
NOVEL ESTERS OF CHRYSANTHEMIC ACID AND ALCOHOLS RELATED TO 2-INDANOL
John W. Morgan, Springfield Township, Hamilton County, Ohio, assignor to The Procter & Gamble Company, Cincinnati, Ohio
No Drawing. Filed Mar. 16, 1970, Ser. No. 20,127
Int. Cl. C07c 69/74
U.S. Cl. 260—468 P
7 Claims

ABSTRACT OF THE DISCLOSURE

Described are chrysanthemic acid (chrysanthemum carboxylic acid) esters of 2-indanol and substituted 2-indanols, and insecticidal compositions containing same. These esters possess unique insecticidal properties and are useful as such in home, garden and agricultural applications.

BACKGROUND OF THE INVENTION

This invention relates to novel chrysanthemic acid esters and to insecticidal compositions containing said esters as an essential active ingredient. Current trends in the chemical control of insects call for inherently safer materials which degrade very rapidly to non-toxic substances once their purpose is accomplished. The safety of the widely used chlorinated hydrocarbons, notably DDT, is currently under question largely because of their poor biodegradability and concomitant persistence. Accordingly, there is great demand for alternative broad spectrum insecticides which are suitable for the high volume usage entailed in agricultural applications. At the same time it is necessary for new insecticides to exhibit a low order of toxicity to warm-blooded animals. Of the several insecticide classes which demonstrate low mammalian toxicity and good biodegradability, pyrethrum, a naturally occurring insecticide mixture, has found widest usage. In addition to its safety advantages, this natural mixture yields rapid knock-down and kill of a broad spectrum of insects; however, it is unstable to light, air, and heat, and is very expensive. The most active component of pyrethrum is pyrethrin and a number of analogous compounds have been proposed for insecticidal use. Allethrin, the most widely used synthetic pyrethrum-like insecticide, while more stable to light and heat than pyrethrum, is nevertheless expensive, a defect which is compounded by the fact that this substance is not synergized by the low cost synergizing agents such as piperonyl butoxide which are typically used in insecticidal compositions. Because of instability, high cost and limited supply, the use of pyrethrum and pyrethrin-like insecticides in garden and agricultural applications has been precluded or seriously limited. At the same time, it is well known that certain insects, in time, may become immune to the insecticidal properties of various chemical agents. It is therefore necessary to have included in the insecticidal armamentarium various novel derivatives of known insecticides which may be utilized once a given class of insects is found no longer to respond to the parent insecticidal composition.

It is therefore an object of this invention to provide novel chrysanthemic acid esters which are biodegradable, effect rapid knock-down and kill of a broad spectrum of insects, and possess low mammalian toxicity.

It is a further object of this invention to provide novel insecticidal compositions containing novel chrysanthemic acid esters of 2-indanol. These and other objects are obtained by the present invention as will become apparent from the following disclosure.

Chrysanthemic acid esters of various alcohols have been previously described. U.S. Pat. 3,268,551 discloses the preparation of phthalimido esters of cyclopropane-carboxylic acids similar to chrysanthemic acid. British Pat. 1,133,554 discloses chrysanthemic acid esters of substituted furfuryl alcohols and their use as insecticides. U.S. Pat. 3,414,607 describes various chrysanthemic acid esters of substituted indanes such as 5-chrysanthemoxy-methylindane. U.S. Pat. 3,285,950 describes the production of esters of chrysanthemic acid with a variety of aliphatic and cyclic unsaturated alcohols.

DETAILED DESCRIPTION OF THE INVENTION

The novel compounds of the present invention are chrysanthemic acid esters of 2-indanol and substituted 2-indanol and the partially reduced forms of 2-indanols, said esters having the formulas:

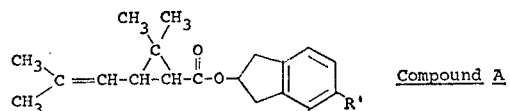

Compound A

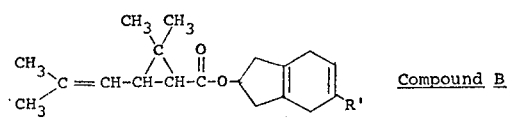

Compound B

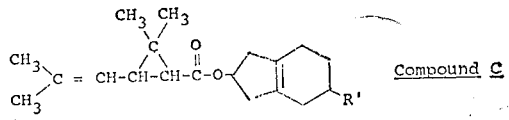

Compound C wherein R' is a member selected from the group consisting of hydrogen, halogen, short-chain alkyl (e.g., methyl, ethyl, propyl), and short-chain alkoxy (e.g., methoxy, ethoxy, propoxyl), aryl, halogen, $NO_2$, $NH_2$, and $COCH_3$. Preferred esters of the above formula include 2-indanyl-(±) - cis-trans - chrysanthemate, 4,7-dihydro-2-indanyl (±) - cis-trans-chrysanthemate, and 4,5,6,7-tetrahydro-2-indanyl-(±)-cis-trans-chrysanthemate.

In general terms, the esters of this invention are prepared by the reduction of commercially available 2-indanone with lithium aluminum hydride to provide the parent alcohol, 2-indanol, according to the method of Hückel and Bollig, Chem. Ber., 86, 1137 (1953). Reaction of 2-indanol with chrysanthemoyl chloride prepared according to the general procedures described by Matsui and Meguro, Agr. Biol. Chem., 28 (1964), incorporated herein by reference, affords certain of the desired esters of this invention. Alternately, certain partially reduced 2-indanols are prepared by the well-known Birch-type reductions and esterified with the chrysanthemic acid or acid chloride to afford various esters of partially reduced 2-indanols. Likewise, various substituted 2-indanones having functional groups R', as previously noted, may be reduced to the respective 5-substituted-2-indanols and esterified with chrysanthemoyl chloride. For example, 5-substituted indanols such as 5-ethyl, 5-methoxy, 5-nitro and 5-acetyl indanols may be prepared according to the general procedures of Inamoto et al., Can. Jour. Chem., 45, 1185 (1192) (1967); esterification of these 5-substituted-2-indanols with chrysanthemoyl chloride affords the corresponding chrysanthemic esters having desirable insecticidal properties. Certain of the reactions are illustrated below.

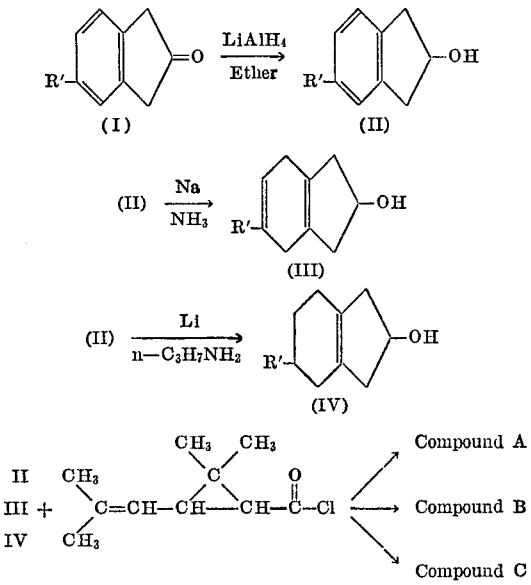

The esterification step of the present invention can be effected in various ways. The 2-indanol compound can be heated with the chrysanthemic acid in the presence of a strong acid, such as aromatic sulfonic acid or sulfuric acid, in an organic solvent capable of azeotropically boiling with water, thereby removing the water formed in the esterification. The 2-indanol compound may also be heated with a lower alkyl ester of the chrysanthemic acid in the presence of a basic catalyst such as sodium hydroxide, potassium hydroxide, sodium alcoholate, or potassium alcoholate, and the like, continuously removing the lower alcohol formed through trans-esterification of the reaction system. In such case, methyl, ethyl, n-propyl and iso-propyl esters are suitable. In the most preferable esterification, the 2-indanol compound may be treated with the chrysanthemic acid halide in an inert organic solvent, preferably in the presence of an agent such as pyridine, triethylamine and other suitable amines, such that the esterification proceeds with the isolation of a hydrohalic acid salt within a short period of time. For this purpose, the acid chloride is the most preferred, though the acid bromide and the acid iodide can be employed.

The compounds of this invention can exist in several isomeric and optically isomeric forms, e.g., cis-configurations, trans-configuration, dexto- and levorotatory forms of each, etc., and mixtures and racemates thereof. It is intended that the claims herein be construed to encompass all such forms and mixtures thereof.

The preparation of the esters of the present invention is described in more detail in the following examples.

EXAMPLE I

Preparation of (±)-cis-trans-2-indanylchrysanthemate

Step 1.—2-indanol: A solution of commercial 2-indanone 5 g., $3.78 \times 10^{-2}$ mol.) in ether (50 ml.) was added dropwise over a 40 minute period to a stirred suspension of lithium aluminum hydride (1.44 g., $3.78 \times 10^{-2}$ mol.) in ether (50 ml.). The resultant mixture was stirred at reflux for 16 hours. The reaction mixture was cooled and 1 N sodium hydroxide (4.5 ml.) was added. The mixture was filtered, the solids washed well with ether, and the combined filtrates were evaporated to give 4.9 g. of white solid. The solid was recrystallized from a mixture of pentane (50 ml.) and ether (25 ml.) to give 3.2 g. of white solid: homogeneous on 20% FFAP at 220° C.; M.P. 68–9° C.;

I.R. (CHCl$_3$) $3460^{3620}$ cm$^{-1}$ (OH)

NMR (CDCl$_3$) $\gamma$ 8.3 (S, 1, OH), 7.0 (AB q, 4, $J_{AB}=16$ Hz., CH$_2$—CHOH—CH$_2$, each line of quartet further split, J=6 Hz. for downfield half and J=3 Hz. for upfield half of quartet), 5.4 (multiplet, 1, CHOH), and 2.9 (S, 4, aromatic hydrogens).

Step 2.—Reaction of 2-indanol with chrysanthemoyl chloride: In a 50 ml. round bottom flask fitted with a magnetic stirrer and a Claisen adapter with serum cap and condenser was placed a mixture of chrysanthemoyl chloride (1.02 g., $5.4 \times 10^{-3}$ mol.), pyridine (0.89 g., $1.1 \times 10^{-2}$ mol.), and benzene (12 ml.). The mixture was stirred and placed under a nitrogen atmosphere after which a solution of 2-indanol (1 g., $7.5 \times 10^{-3}$ mol.) prepared as in Step 1 of Example I in benzene (12 ml.) was added through the serum cap. The mixture was stirred at 54° C. for 24 hours, cooled, and diluted with ether (20 ml.). The mixture was then washed with 1 N-hydrochloridic acid (10 ml.), 1 N sodium hydroxide (10 ml.), and water (10 ml.). The organic layer was dried (MgSO$_4$) and evaporated to give 2.8 g. of liquid which was purified by column chromatography on Florisil (20 ml.). Six fractions (50 ml. each) were eluted with hexane and two more with 5% ether-hexane. These fractions were combined, evaporated, and the residue distilled to give 0.8 g. of liquid: homogeneous on 20% SE–30 at 200° C.; I.R. (film) 1725 cm.$^{-1}$ (ester C=O); NMR (CDCl$_3$) $\gamma$ 8.8 and 9.0 (two singlets with fine structure, 6, cyclopropyl methyls),

7.9–8.5 (complex area, 2, cyclopropyl hydrogens), 7.0 (AB quartet, $J_{AB}=17$ Hz.), upfield side of quartet has broad peaks, downfield side has split peaks, J=6 Hz.

$$\overset{O}{\underset{}{CH-CH-CH_2}}$$

4.6 and 5.2

(complex area, 2, CH—OĊ and >=<$_H$)

and 3.0 (S, 4, aromatic hydrogens).

EXAMPLE II

Preparation of (±)-cis-trans-4,7-dihydro-2-indanylchrysanthemate

Step 1.—4,7-dihydro-2-indanol: Ammonia (35 ml.) was distilled through a potassium hydroxide trap and condensed in a 100 ml. 3-neck round bottom flask fitted with a Dry Ice condenser, mechanical stirrer, and addition funnel. A solution of 2-indanol (1 g., $7.5 \times 10^{-3}$ mol.) in ethanol (10 ml.) was added to the stirred ammonia followed by the addition of small pieces of sodium (1 g., $4.35 \times 10^{-2}$ mol.). The mixture turned dark blue and then colorless after the sodium had been added. Most of the ammonia was evaporated followed by the slow addition of water (30 ml.) to the reaction residue. This mixture was extracted with ether (3× 20 ml.) and the combined extracts were washed with saturated sodium chloride (2×10 ml.) and dried (MgSO$_4$). Evaporation yielded 1.0 g. of colorless liquid which on distillation gave 0.63 g. colorless liquid: 95% pure on 20% FFAP at 200° C.; B.P. 72° C./0.4 mm.; I.R. (film) 3340 cm.$^{-1}$ (OH), 3030 cm.$^{-1}$ (CH=CH); NMG (CCl$_4$) τ 7.7 (AB quartet, 4, J=16 Hz., CH$_2$—CHOH—CH$_2$, downfield side of quartet split, J=6 Hz., upfield side broadened), 7.4 (S, 4, cyclohexadiene allylic protons), 5.9 (broad singlet, 1, OH), 5.7 (complex region, 1, CHOH), and 4.4 (S, 2, vinyl protons). A small absorption at 3.0 τ is probably due to the starting 2-indanol (less than 5% by NMR integration).

Step 2.—Reaction of 4,7-dihydro-2-indanol with chrysanthemoyl chloride: To a solution of chrysanthemoyl chloride (2.75 g., 1.47×10$^{-2}$ mol.) in benzene (6 ml.) was added pyridine (2.3 g., 2.9×10$^{-2}$ mol., distilled from potassium hydroxide). The mixture was cooled, stirred magnetically, and placed under a nitrogen atmosphere. A solution of 4,7-dihydro-2-indanol (2.0 g., 1.47×10$^{-2}$ mol.) prepared as in Step 1 of Example II in benzene (6 ml.) was added through a serum cap and the resultant mixture was stirred at room temperature for 24 hours. The reaction mixture was diluted with ether (20 ml.), washed with 1 N hydrochloric acid (10 ml.), 1 N sodium hydroxide (10 ml.), water (10 ml.), and the organic layer dried (MgSO$_4$). Evaporation gave 6 g. of yellow liquid which was chromatographed on Florisil (60 ml.). Ten 50 ml. fractions were eluted with hexane and 5 fractions were eluted with 10% ether-hexane. The fractions were combined, evaporated, and the residue distilled (pot temperature 140–155° C./0.05 mm.) to yield 3.2 g. of liquid: greater than 95% pure on 20% QF–1 at 200° C.; I.R. (film) 1725 cm.$^{-1}$ (ester C=O), NMR (CCl$_4$) τ 8.8 and 8.9 (two singlets, 6, cyclopropyl methyls),

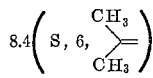

7.4 (S, 4, cyclohexadiene allylic protons), 7.2–8.5 (complex area, 6, cyclopropyl hydrogens and CH$_2$CHORCH$_2$), 4.6–5.3

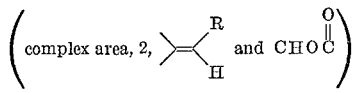

and 4.4 (S, 2, —CH=CH—). The I.R. of this ester showed no change after 2 months storage at room temperature.

EXAMPLE III

Preparation of (±)-cis-trans-4,5,6,7-tetrahydro-2-indanyl chrysanthemate

Step 1.—4,5,6,7-tetrahydro-2-indanol: Lithium (1.44 g., 2.1×10$^{-1}$ mol.) was added to a stirred mixture of n-propylamine (65 ml.) and 2-indanol (2.5 g., 1.86×10$^{-2}$ mol.) and the resultant mixture was stirred for 22 hours. Solid ammonium chloride was added until no further reaction occurred; this was followed by the addition of water (100 ml.) and ether (100 ml.). The layers were separated and the organic layer was dried (MgSO$_4$) and evaporated to give 4.6 g. of red liquid. Distillation yielded 2.1 g. of pink liquid [B.P. 110–114° C./11 mm.] which was sublimed twice and the resultant solid recrystallized twice from hexane to yield 0.9 g. of solid: greater than 95% pure on 20% FFAP at 200° C.; M.P. 49–50.5° C., I.R. (CHCl$_3$) $\begin{matrix} 3610 \\ 3440 \end{matrix}$ cm$^{-1}$(OH)

NMR (CDCl$_3$) τ 7.2–8.4 (complex area, 13), and 5.6 (complex multiplet, 1, CH$_2$—CHOH—CH$_2$). There was no vinyl absorption in the NMR.

Step 2.—Reaction of 4,5,6,7-tetrahydro-2-indanol with chrysanthemoyl chloride: To a magnetically stirred solution of chrystanthemoyl chloride (1.1 g., 5.9×10$^{-3}$ mol.) and pyridine (0.85 ml., 1.1×10$^{-2}$ mol.) in benzene (10 ml.) under an atmosphere of nitrogen was added a solution 4,5,6,7-tetrahydro-2-indanol (0.83 g., 6.0×10$^{-3}$ mol.) prepared as in Step 1 of Example III in benzene (10 ml.). This mixture was stirred at 50° C. for 22 hours, cooled, and diluted with ether (25 ml.). The mixture was washed with 1 N hydrochloric acid (10 ml.), 1 N sodium hydroxide (10 ml.), and water (20 ml.). The organic layer was dried (MgSO$_4$), and evaporated to yield 2.0 g. of yellow liquid which was purified by column chromatography with Florisil (20 ml.). Four 50 ml. fractions were eluted with hexane and 3 with 10% ether-hexane. The combined fractions were evaporated and the residue distilled (pot temperature 120° C./0.1 mm.) to give 1.2 g. of colorless liquid: homogeneous on 20% SE–30 at 200° C.; I.R. (film) 1725 cm.$^{-1}$ (ester C=O; NMR (CDCl$_3$) τ 7.2–8.9 (complex area, 26, an absorption at 8.3 for the vinyl methyl groups was present as were absorptions at 8.8 and 8.9 for the cyclopropyl methyl groups), and 4.6–5.7

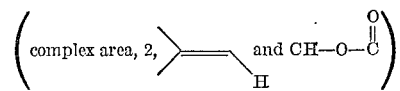

Additional compounds encompassed by the present invention can be prepared, for example, by first preparing 5-substituted indanols as described by N. Inamoto et al., Can. Jour. Chem., 45, 1185 (1967) and condensing said 5-substituted-2-indanols with chrystanthemoyl chloride or chrysanthemic acid as described above. For example, acylation of 2-indanol acetate with acetyl chloride and aluminum chloride in carbon disulfide yields 5-acetyl-2-indanol acetate. Baeyer-Villiger oxidation of 5-acetyl-2-indanol acetate with meta-chloroperbenzoic acid in dichloromethane yields 5-aectoxy-2-indanol acetate; subsequent reaction with lithium alumium hydride and methylation with dimethyl sulfate gives 5-methoxy-2-indanol. Alternatively Wolff-Kishner reduction of 5-acetyl-2-indanol acetate gives 5-ethyl-2-indanol; condensation of these 5-substituted-2-indanols with chrysanthemoyl chloride yields 5-substituted-2-indanol chrysanthemates useful as insecticides. Thus, from 5-ethyl-2-indanol and 5-methoxy-2-indanol are prepared, respectively, (±)-cis-trans-5-ethyl-2-indanyl chrystanthemate and (±)-cis-trans-5-methoxy-2-indanyl chrystanthemate. Additional compounds encompassed by the present invention may be prepared, for example, by replacing the 2-indanone of Example I, Step 1, with 5-methyl or 5,6-dimethyl-2-indanone prepared as described by A. J. Birch et al., J. Chem. Soc., 2209 (1963), reducing these substituted indanones as described in Example I, Step 1, and esterifying with chrysanthemic acid or chrysanthemoyl chloride. Thus, from 5-methyl-2-indanone is prepared (±-cis-trans-5-methyl-2-indanyl chrysanthemate.

The outstanding insecticidal properties of the compounds of this invention can be seen from the following examples:

EXAMPLE IV (±)-cis-trans-2-indanyl chrysanthemate, (±)-cis-trans-4,7-dihydro-2-indanyl chrystanthemate, and (±)-cis-trans-4,5,6,7-tetrahydro-2-indanyl chrystanthemate, and natural pyrethrum were each dissolved in acetone and dispersed in distilled water with Triton X–100 emulsifier. The samples were applied for a ten second period to houseflies retained in a 2″ x 5″ diameter screened cage. The sprays were applied from the waters vertical spray tower operating at 10 p.s.i. and discharging about 30 ml. of material per minute through an atomizer. The spray descends through an 8″ stainless steel cylinder to test insects below the atomizer. The insects were retained in the sprayed cages for mortality observations. Test samples having various percentage compositions of weight (W) of test compound to spray volume (V) were utilized in the tests. The results are set forth in Table 1 below.

TABLE 1.—HOUSEFLY MORTALITY TESTS

| Chrysanthemic acid ester | Percent W/V | Percent mortality (24 hours) |
|---|---|---|
| (±)-cis-trans-2-indanyl chrysanthemate (Example I) | 0.01 | 6 |
| | 0.01+0.1 PB | 100 |
| | 0.005 | 1 |
| | 0.005+0.05 PB | 82 |
| | 0.001 | 0 |
| | 0.001+0.01 PB | 4 |
| (±)-cis-trans-4,7-dihydro-2-indanyl chrysanthemate (Example II) | 0.01 | 10 |
| | 0.01+0.1 PB | 100 |
| | 0.005 | 6 |
| | 0.005+0.05 PB | 72 |
| | 0.001+0.1 PB | 15 |
| (±)-cis-trans-4,5,6,7-tetrahydro-2-indanyl chrysanthemate (Example III) | 0.01 | 72 |
| | 0.01+0.1 PB | 100 |
| | 0.005 | 20 |
| | 0.005+0.05 PB | 100 |
| | 0.0025+0.025 PB | 63 |
| Pyrethrum [1] | 0.01 | 33 |
| | 0.01+0.1 PB | 100 |
| | 0.005 | 29 |
| | 0.005+0.05 PB | 100 |
| | 0.0025 | 4 |
| | 0.0025+0.025 PB | 100 |
| | 0.001 | 0 |
| | 0.001-, 0.01 PB | 31 |

[1] Typical values for pyrethrum and pyrethrum plus PB.

NOTE.—Piperonyl butoxide (PB), an insecticidal synergist, has essentially no insecticidal activity at the concentrations reported above.

As can be seen from the foregoing examples, representative compounds of this invention possess excellent insecticidal properties. Additionally, the compounds of the instant invention are substantially less toxic to mammals than are most common insecticides, including pyrethrum.

The compounds of the instant invention are similarly effective when tested against the Southern army worm, the Mexican bean beetle, the pea aphid, the mite, the German cockroach, the adult mosquito, adult stable flies, black carpet beetle larva, webbing cloths moth larva, adult rice weevils, and adult sawtooth grain beetles.

Insecticidal compositions containing the esters of the present invention can be formulated and utilized as oil solutions, emulsifiable concentrates, wettable powders, dust, aerosols, or impregnated into wood, fabrics, etc., and provide a long lasting residual effect. Such compositions can include the generally employed carriers or diluents and auxiliary agents which are well-known to those skilled in the art. For example, suitable dusts can be prepared by admixing the compounds of the invention with dry free-flowing powders such as clay, bentonite, fuller's earth, diatomaceous earth, pyrophyllite, attapulgite, calcium carbonate, chalk or the like. The active compounds of the invention normally comprise up to about 10% by weight of such dust formulations. An amount of up to about 3% is preferred and is suitable for most applications.

Likewise, suspensions or dispersions of the compounds in a non-solvent, such as water, may be suitably employed for the treatment of foliage. Also suitably employed are solutions of the insecticides of the invention in oil which is emulsified in water. Examples of oil solvents include hydrocarbons such as benzene and toluene, halogenated hydrocarbons such as chlorobenzene, chloroform, fluorotrichloromethane and dichlorodifluoromethane, and commercial mixtures of hydrocarbons such as the common Stoddard solvents, petroleum ethers, and the like.

Aerosols can be prepared by dissolving compounds of the invention in a highly volatile liquid carrier such as trifluorochloromethane, nitromethane, dichlorodifluoroethane and the like, or by dissolving such compounds in a less volatile solvent, such as benzene or kerosene, and admixing the resulting solution with a highly volatile liquid aerosol carrier such as the polyfluorohydrocarbons commonly used as aerosol propellants.

The novel compounds of the invention are useful for destroying a variety of insects. Accordingly, a method aspect of the present invention comprises combating insects by applying to insects or to an insect habitat one or more of novel compounds of the invention.

Preferably the esters of this invention are employed in combination with a synergistic agent, for example, piperonyl butoxide, piperonyl sulfoxide, β-butoxy-β'-thiocyanodiethyl ether and the like.

What is claimed is:

1. A compound of the formula $$CH_3 \underset{CH_3}{\overset{}{\diagdown}} C = CH - CH \underset{}{\overset{CH_3 \diagup CH_3}{\diagdown C \diagup}} CH - \overset{O}{\overset{\|}{C}} - R$$

wherein R is a material selected from the group consisting of

[indanyl, 4,7-dihydro-2-indanyl, 4,5,6,7-tetrahydro-2-indanyl structures shown as —O— attached to bicyclic ring systems]

and

[—O— attached to indanyl ring with R' substituent]

wherein R' is methyl, ethyl or methoxy.

2. A compound in accordance with claim 1 which is (±)-cis-trans-2-indanyl chrysanthemate.

3. A compound in accordance with claim 1 which is (±)-cis-trans-4,7-dihydro-2-indanyl chrysanthemate.

4. A compound in accordance with claim 1 which is (±)-cis-trans - 4,5,6,7 - tetrahydro-2-indanyl chrysanthemate.

5. A compound in accordance with claim 1 which is (±)-cis-trans-5-ethyl-2-indanyl chrysanthemate.

6. A compound in accordance with claim 1 which is (±))-cis-trans-5-methoxy-2-indanyl chrysanthemate.

7. A compound in accordance with claim 1 which is (±)-cis-trans-5-methyl-2-indanyl chrysanthemate.

References Cited
UNITED STATES PATENTS 3,414,607   12/1968   Fujimoto et al. _____ 260—468

LORRAINE A. WEINBERGER, Primary Examiner

R. GERSTL, Assistant Examiner

U.S. Cl. X.R.

424—306